(12) United States Patent
Groves

(10) Patent No.: US 12,638,984 B2
(45) **Date of Patent: *May 26, 2026**

(54) SHARED MEMORY SNAPSHOTS

(71) Applicant: MICRON TECHNOLOGY, INC., Boise, ID (US)

(72) Inventor: John Groves, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/777,955

(22) Filed: Jul. 19, 2024

(65) Prior Publication Data

US 2024/0377973 A1     Nov. 14, 2024

Related U.S. Application Data

(63) Continuation of application No. 17/895,918, filed on Aug. 25, 2022, now Pat. No. 12,073,097.

(51) Int. Cl.
G06F 3/06 (2006.01)

(52) U.S. Cl.
CPC .......... G06F 3/0625 (2013.01); G06F 3/0629 (2013.01); G06F 3/0679 (2013.01)

(58) Field of Classification Search
CPC ..... G06F 3/0625; G06F 3/0679; G06F 3/0629
USPC ......................................................... 711/154
See application file for complete search history.

(56) References Cited

U.S. PATENT DOCUMENTS

| | | | |
|---|---|---|---|
| 10,409,770 B1 * | 9/2019 | Ye ......................... | G06F 16/162 |
| 2015/0212893 A1 | 7/2015 | Pawar et al. | |
| 2020/0026611 A1 | 1/2020 | Amlekar et al. | |

* cited by examiner

*Primary Examiner* — Hua J Song
(74) *Attorney, Agent, or Firm* — Lowenstein Sandler LLP

(57) ABSTRACT

A system can include a memory device and a processing device operatively coupled with the memory device, to perform operations including recording, in a change log associated with a snapshot of a data object, an entry reflecting a change made by a first host application to the data object, wherein the entry contains information reflecting a current state of a part of the data object; receiving a request to read the part of the data object; determining whether the request is received from the first host application; and responsive to determining that the request is received from the first host application, retrieving the part from the entry of the change log.

17 Claims, 8 Drawing Sheets

300

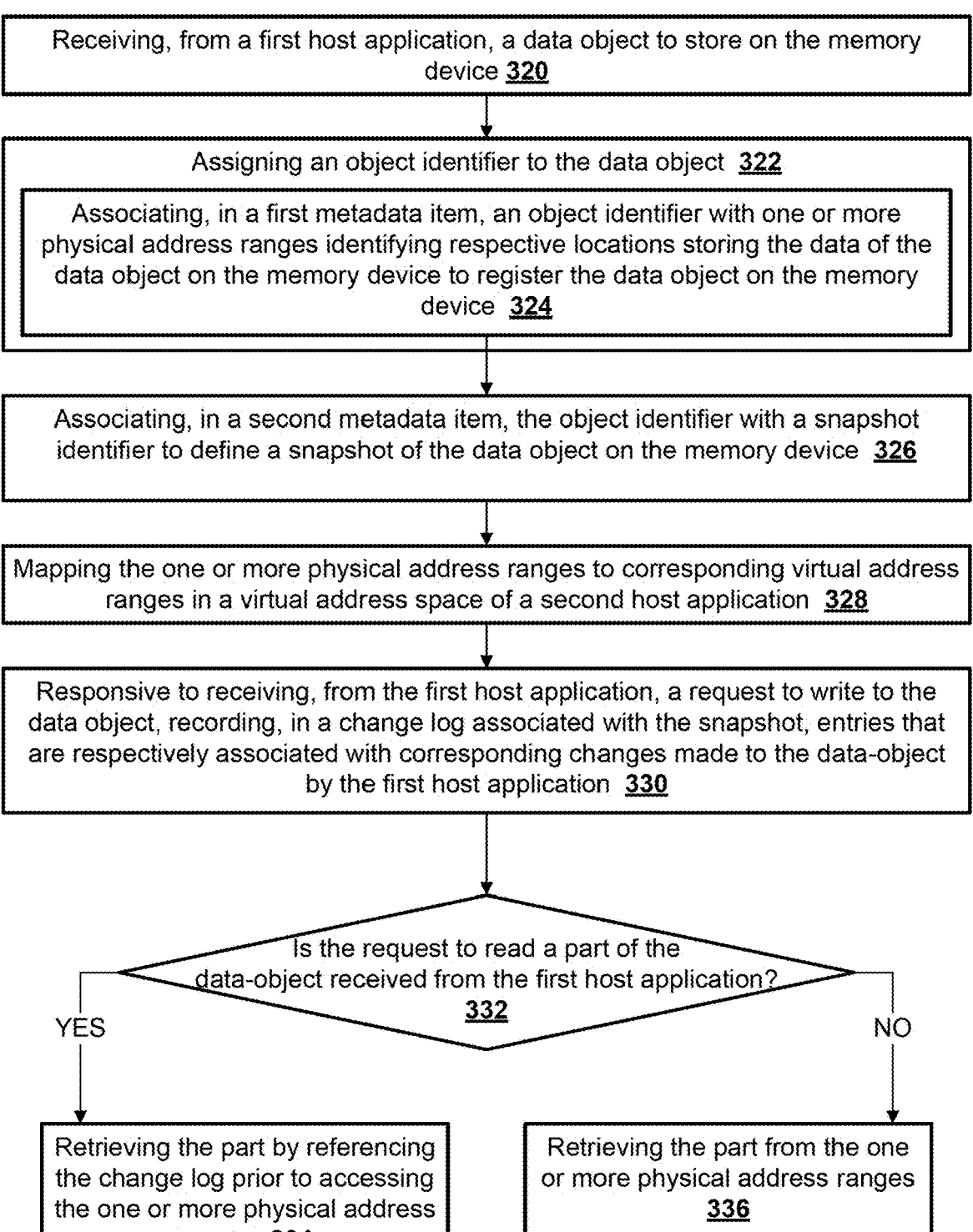

Receiving, from a first host application, a data object to store on the memory device 320

Assigning an object identifier to the data object 322

Associating, in a first metadata item, an object identifier with one or more physical address ranges identifying respective locations storing the data of the data object on the memory device to register the data object on the memory device 324

Associating, in a second metadata item, the object identifier with a snapshot identifier to define a snapshot of the data object on the memory device 326

Mapping the one or more physical address ranges to corresponding virtual address ranges in a virtual address space of a second host application 328

Responsive to receiving, from the first host application, a request to write to the data object, recording, in a change log associated with the snapshot, entries that are respectively associated with corresponding changes made to the data-object by the first host application 330

Is the request to read a part of the data-object received from the first host application? 332

YES                                                                          NO

Retrieving the part by referencing the change log prior to accessing the one or more physical address ranges 334

Retrieving the part from the one or more physical address ranges 336

SHARED MEMORY SNAPSHOTS

RELATED APPLICATIONS

This application is a continuation application of co-pending U.S. patent application Ser. No. 17/895,918, filed Aug. 25, 2022, which is incorporated herein by reference.

TECHNICAL FIELD

Embodiments of the disclosure relate generally to memory sub-systems, and more specifically, relate to managing shared memory snapshots on memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a flow diagram of an example method for performing memory snapshot management on memory devices in accordance with some embodiments of the present disclosure;

DETAILED DESCRIPTION

Figure 1:
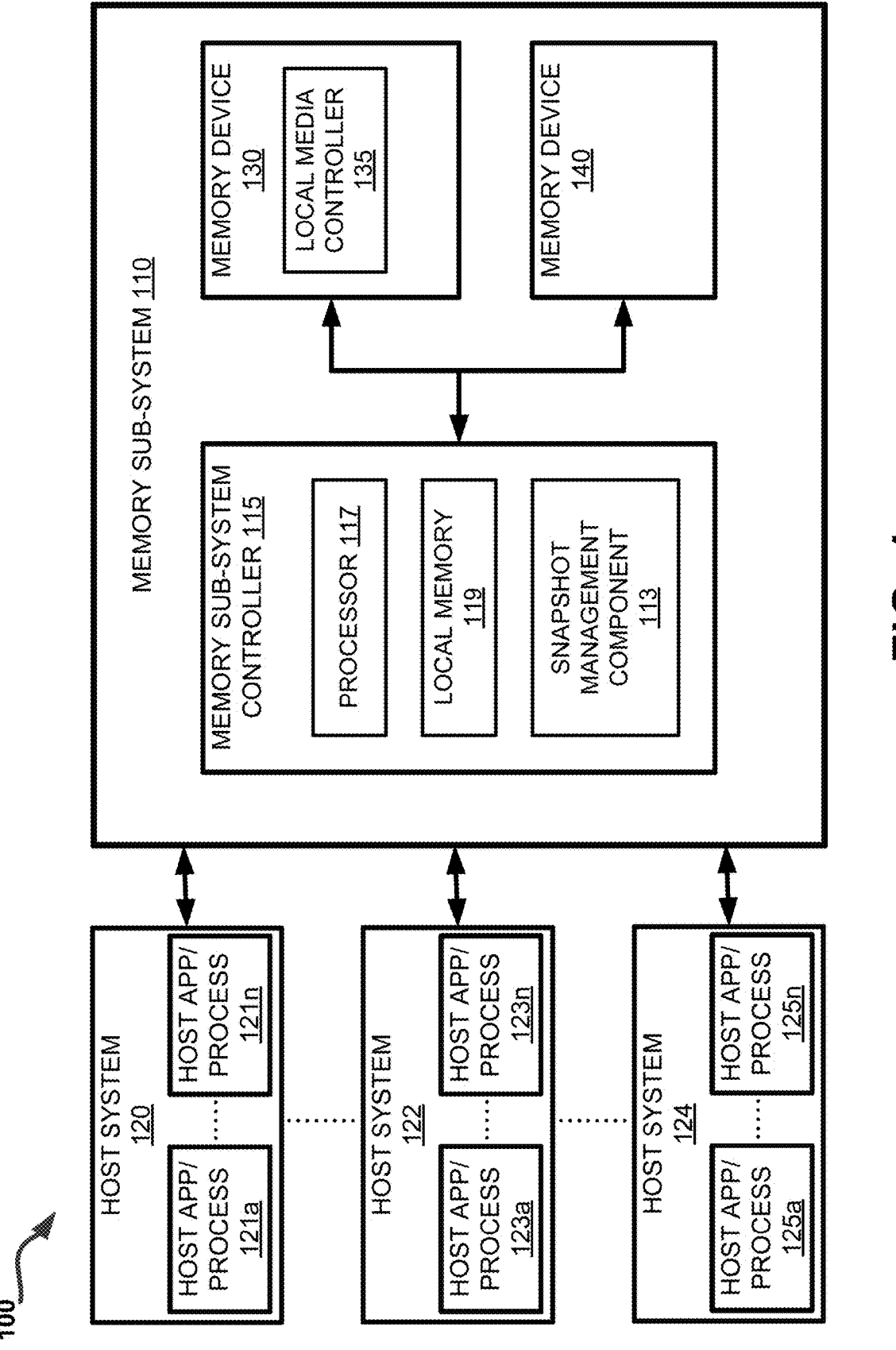
FIG. 1 illustrates an example computing system that includes a memory sub-system in accordance with some embodiments of the present disclosure.

Aspects of the present disclosure are directed to managing shared memory snapshots in memory devices. A memory sub-system can be a storage device, a memory module, or a combination of a storage device and memory module.

Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. In some embodiments, the memory sub-system can utilize one or more memory devices, including any combination of the different types of non-volatile memory devices and/or volatile memory devices, to store the data provided by the host system. One example of non-volatile memory devices is a negative-and (NAND) type flash memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane can consist of a set of physical blocks. Each block can consist of a set of pages. Each page can consist of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Computing environments have increasingly become more reliant on the use of fabric-attached memory (FAM) devices such as persistent memory (PMEM) devices. In the context of these computing environments, the term "fabric" can refer to interconnected communication paths that route signals on major components of a chip or between chips of a computing system. Thus, "fabric" can refer to an architecture of interconnections between processing or compute nodes within a computing device or between multiple computing devices. For example, in some instances "fabric" can refer to a bus or set of connections that connect a processing device to peripheral devices and other processing devices, while in other instances "fabric" can also refer to a set of network connections between combinations of respective computing nodes and memory nodes.

FAM devices can include memory devices connected to the processor through a high-speed bus (e.g., a Peripheral Component Interconnect Express (PCIe) bus) as well as memory devices connected indirectly to a remote (i.e., located on a different chip or housed in a different enclosure) processing device via a network connection interface utilizing the high-speed bus. One such interface is the compute express link (CXL) interface, which is an interface that can support several protocols that can run on top of PCIe, including a CXL.io protocol, a CXL.mem protocol, and a CXL.cache protocol, described in more detail below.

Additionally, FAM is a type of memory that can be accessed by one or more processors each of which are on different local computing systems. In some cases, FAM PMEM devices allow multiple processing threads or multiple processing systems to access the same data objects stored on the memory. For example, different processes on a single processing device can access the same data object on a FAM. Similarly, FAM can enable different processing devices on different host systems to access the same data object on a memory device. FAM PMEM devices can include high-density, byte-addressable, storage-class, non-volatile memory (NVM) and low-latency interconnects allowing FAM devices to be shared across heterogeneous and decentralized compute nodes. In some systems, the same physical address space of a FAM PMEM device can be available to multiple different processes or different processing devices and consequently be mapped to multiple respective logical address spaces used by the different processes or by different processing devices. The logical address spaces can contain addresses corresponding to physical memory locations found in processing device caches, random access memory (RAM) devices, and FAM PMEM devices.

Thus, systems utilizing FAM devices allow data objects created by one process or application running on a host processing device (collectively herein referred to herein as a "producer" as further defined below) to be accessed by another host process or application (collectively referred to herein as a "consumer" as further defined below). Generally, a producer creates, maintains, and updates data objects in the memory while a consumer reads the data objects. Accordingly, at a particular point in time there can be a part of the data object in the producer's cache, the memory device, and in one or more consumers' caches (i.e., when a producer has read-cached part of the data). Note that the cache of a processing device of a host system on which a producer application is executing can be considered the "source of truth" with respect to the current state of an item of data for the purposes of this disclosure. Accordingly, if data in memory is fetched from the producer's cache, it, by definition is not "stale" since the cache contains the master copy of the data (i.e., the reference copy of the data to which other copies of the data are compared) when data exists in both the cache and a memory device.

However, this causes problems in situations where caches associated with the producer (e.g., producer processor caches) are not shared or associated with the consumer as well as in situations where modified cache lines are written back to the memory device in an order that results in inconsistencies between the data that is in the producer's cache and the data that is on the memory device (i.e., since modified cache lines in a processor cache do not have to be written back to the memory device in a chronologically sequential order). Accordingly, this further causes inconsistencies between the data on the memory device and the data in a consumer's cache (e.g., producer processor cache).

Some approaches address this consistency issue by having systems share memory objects as network messages or via remote direct memory access (RDMA). However, these approaches often involve making a copy of the object and moving the copy across a network to me stored on a remote memory location. Other approaches involved transactional updating of shared memory objects resulting in complex consumer operation synchronization requirements. For example, transactionally updating a data object using a read-copy-update (RCU) mechanism that enforces limits on access to a part of a data object that is being updated on the memory device requires knowledge of potential access requests from multiple remote consumers and entail complex synchronization to ensure that a consumer isn't accessing a part of the data object that is undergoing modification by the producer. Naturally, this approach entails continually monitoring for changes to the data object on the memory device so that if any changes are detected the consumer can be forced to invalidate the corresponding data in the consumer's cache and to reload the updated data from the memory device to the consumer's cache. Thus, in a FAM environment where consumers require a consistent view of objects in shared memory, this type of fine-grained synchronization consumes a lot of time and computing resources as each update or modification of the data object is propagated to each of the respective consumer's caches to maintain consistency. Therefore, these approaches can either lead to an inconsistent (i.e., "stale") view of the data object for consumers or need an expensive cache-consistency protocol requirement which is difficult to implement without definitive knowledge of all the possible requests by remote consumers (i.e., processes running on processing devices of remote consumer host systems which are not visible to the producer's host system or the memory device).

Aspects of the present disclosure address the above and other deficiencies with a memory sub-system that manages shared snapshots of data objects in memory and ensures consistency. More specifically, in the embodiments described herein, the memory subsystem can define snapshots of data objects on a memory device and isolate producer modifications (i.e., writes) and accesses (i.e., reads) to the data object from consumer accesses (i.e., reads) to the snapshots of the data objects. In some embodiments, consumer accesses can be confined to a particular snapshot of a data object so that they are not affected by producer modifications or updates of the data object on the memory device. For the purposes of this disclosure, with respect to a particular data object, the term "producer" refers to a process or application, being executed on a processing device of a host system, that generates and/or modifies the data object (i.e., has read/write access). Similarly, for the purposes of this disclosure, with respect to a particular data object, the term "consumer" refers to a process or application, being executed on a processing device of a host system, that reads but does not create or modify the data object (i.e., has read-only access). Accordingly, if a host application generates and/or modifies a data object, it can be referred to as a producer, and if a host application reads but does not create or modify the data object, it can be referred to as a consumer. In the several embodiments described in more detail below, the consumer can read a data object by accessing a particular snapshot (e.g., by referencing a specific snapshot ID) of the data object on the memory device. In comparison, the producer can have more permissive capabilities, and can both read and write access such that it can create the particular snapshots of the data object as well as read and modify the data object directly. Some general features of embodiments are provided below with additional details explained with further reference to FIGS. 1 and 2A-2C.

In some embodiments the memory sub-system can receive a data object from a producer to store on a memory device. The memory sub-system can assign an object identifier to the data object and associate it with one or more physical address ranges or physical address extent-lists (i.e., non-contiguous address ranges) to "register" the data object on the memory device and indicate that the data object is subject to snapshotting. Consequently, the memory sub-system can map the physical address ranges to corresponding virtual address ranges within the virtual address space available to the producer. This mapping can be referred to as "producer mapping" for the purposes of this disclosure. If the producer has parts of the data object present in the producer's cache that have not been modified since being stored on the memory device, they would be consistent with the corresponding parts of the data object on the memory device. For the purposes of this disclosure, "consistent" refers to data (e.g., the data object or portions of the data object) being in an identical state (i.e., uniform) between two or more locations.

To create (i.e., define) a snapshot of a data object, in some embodiments, the memory sub-system can associate the object identifier with a snapshot identifier. The defined snapshot can thus be associated with the physical address ranges with which the data object identifier registered the data object on the memory device. Note that, in some embodiments, the creation of the snapshot need not entail the creation of a duplicate copy of the data object, but rather refers to the association of a data object with a snapshot ID identifying the state of the data object at a particular point in time. Accordingly, by association with the object identifier, the snapshot identifier is also associated with the aforementioned physical address ranges. Thus, since the physical address ranges are now associated with the snapshot, the memory sub-system can "map the snapshot to a consumer" by mapping the physical address ranges with corresponding virtual address ranges in a virtual address space available to a consumer. This mapping can be referred to as "consumer mapping" for the purposes of this disclosure.

As noted earlier, producers can make changes to parts of data objects present in the producer's cache and then store those changes by updating the data object (e.g., by updating the modified parts of the data object) on the memory device accordingly (i.e., flush the cache to the memory device). The various embodiments described in the present disclosure can have different ways of handling modifications or changes that a consumer makes to the data objects. In some embodiments, the changes can be recorded by using a change log (e.g., by storing either the current/modified states or the previous states of data object parts in the change log). In other embodiments, the memory sub system can create a duplicate copy of the data object (i.e., one data object copy associated with a snapshot and mapped to a consumer's virtual address space and another data object copy subject to direct modification by a producer) on the memory device so that changes can be recorded in one of the copies while the other copy remains unmodified. Additionally, the various embodiments can employ different approaches for handling read requests from a host application depending on whether the read request is received from a consumer or a producer. In embodiments that use a change log, read requests handling can depend on whether the request was received from a consumer or from a producer. Conversely, in embodiments that use a duplicate copy of a data object, the memory sub-system can respond to read requests from a producer and those from a consumer by retrieving the requested data respectively from the different duplicate copies of the data object.

In embodiments that use a change log, the change log can be stored in a different location on the same device or on a different device than the memory object. For example, in some embodiments, changes to parts of the data object can be recorded by replacing the corresponding part of the data object in the physical location (i.e., that was in a previous or original state) on the memory device with the changed part of the data object (i.e., in a new or modified state) and creating an entry in the change log that contains the previous state of the part data object that was modified. Alternatively, in other embodiments changes to parts of the data object can be recorded by creating an entry in the change log that contains the modified part of the data object (i.e., in a new or modified state) while the corresponding part of the data object stored in its physical location remains unchanged (i.e., in a previous or original state). For ease of reference, a change log that contains entries with previous states of parts of a data object can be referred to as a "previous-state log", while a change log that contains entries with current states of parts of a data object can be referred to as a "current-state log" where, for a particular part of a data object, "previous" and "current" states are defined relative to the latest state of that part in the cache of the producer.

Accordingly, in embodiments using a current-state log, the memory sub-system can refer to the current-state log when it receives read requests to determine whether changes were made to the requested part of the data object so that it can provide the requested part in a state that is consistent with the requester's (e.g., consumer's or producer's) mapping. Therefore, the memory sub-system can respond to read requests differently depending on whether the read request is received from a consumer or from a producer. Thus, in some of these embodiments, in response to read requests from a producer, the memory sub-system will refer to the current-state log prior to providing the requested data, while, in response to read requests from a consumer, the memory sub-system will forego referring to the current-state log prior to providing the requested data.

Similarly, in embodiments using a previous-state log, the memory sub-system can refer to the previous-state log when it receives read requests to determine whether changes were made to the requested part of the data object so that it can provide the requested part in a state that is consistent with the requester's mapping. While in these embodiments, just as in embodiments that use a current-state log, the memory sub-system can also respond to read requests differently depending on whether the read request is received from a consumer or from a producer, the handling of the requests is reversed. In other words, in embodiments using a previous-state log, responsive to read requests from a producer, the memory sub-system will forego referring to the previous-state log prior to providing the requested data, while, in response to read requests from a consumer, the memory sub-system will refer to the previous-state log prior to providing the requested data.

Accordingly, the memory sub-system can modify parts of the data object on the memory device to create a modified data object (e.g., by storing the modified data object in the location on the memory device where it resided prior to being modified, or in a different location on the memory device). In some embodiments, the memory sub system can create new snapshots by associating the data object (i.e., along with its corresponding physical address ranges) with a new snapshot identifier. Note that, in some embodiments, the creation of a new snapshot need not entail the creation of an entire new duplicate copy of the data object, but rather refers to the association of the data object with a new (i.e., different) snapshot ID identifying the state of the data object at a different point in time than that of a previous snapshot. The memory sub-system can then map the new snapshot identifier of the data object with the physical address ranges containing the modified data object to corresponding virtual address ranges in the virtual address space of a consumer. In some embodiments, the memory sub-system can "erase" a snapshot by removing the association of the snapshot's identifier with the data object and can cause the consumer to un-map the physical memory addresses of that snapshot of the data object from their corresponding virtual memory addresses so that those corresponding virtual memory addresses can be mapped to a new subsequent snapshot of the data object. In some embodiments, even after creating a new snapshot of the data object, the memory system can permit consumers to continue referencing an older (i.e., previous) snapshot. That is, even after the memory sub-system defines a new snapshot, it can retain the old snapshot of the data object (i.e., retain the association between the previous snapshot identifier and the change log entries or the physical memory locations where the parts of the data object are stored in the states consistent with the previous snapshot mapping). Accordingly, since multiple snapshots of a data object can, in some embodiments, be present on the memory device, the memory sub-system can receive requests, from some consumers, referencing an earlier snapshot of the data object while also receiving, from other consumers, requests referencing a later snapshot of the data object.

Advantages of the present disclosure include a significant reduction in the amount of resources and time used for maintaining consistency of data objects between producers and consumers in shared memory, such as FAM PMEM. Embodiments of the present disclosure allow a single data object snapshot on a memory device to be mapped to and accessed by multiple different consumers without requiring duplicate copies of the data object to be created for each consumer. At the same time, the several embodiments enable a producer to make changes to the data object on the memory device without disrupting accesses by the consumers and without causing inconsistencies. Defining snapshots at specified times and making a data object accessible to consumers through snapshot mapping isolates the changes made by producers from being visible to consumers until the changes are incorporated in a subsequent snapshot of the data object. Accordingly, because consumers' virtual address ranges are mapped to corresponding physical address ranges associated with a particular snapshot, the references to the data objects in consumer memory are always consistent with the snapshot data. Furthermore, in the various embodiments, both consumers and producers can perform read-cached access to parts of the data object without interfering with one another since the read requests from consumers are treated differently than those of consumers. Thus, the embodiments disclosed herein enable multiple consumers to access consistent and up-to-date information of the latest snapshot of the data object that they have mapped and allow producers to control the creation and removal of snapshots of the data object without creating multiple duplicate copies of the data object for each consumer or performing complex access synchronization that depends on knowledge of all potential consumer access requests at a given time. These and other features of the embodiments of the present disclosure are described in more detail with reference to FIG. 1.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such devices.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. In other embodiments, the memory sub-system 110 is coupled to multiple host systems 120, 122, 124. FIG. 1 illustrates one example of multiple host systems 120, 122, 124 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host systems 120, 122, and 124 can each include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host systems 120, 122, 124 use the memory sub-system 110, for example, to write data to the memory sub-system 110 and read data from the memory sub-system 110. In some embodiments, each of the host systems 120, 122, and 124 can include processing devices that execute one or more applications or processes (both processes and applications being executed by a host system collectively referred to herein as "host applications"). For example, host system 120 can have host applications 121a-121n being executed on its processing device. Similarly, host systems 122 and 124 can execute host applications 123a-123n and 125a-125n, respectively.

Each of the host systems 120, 122, and 124 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120, 122, 124 and the memory sub-system 110. The host system 120, 122, 124 can further utilize an NVM Express (NVMe) interface to access components (e.g., memory devices 130) when the memory sub-system 110 is coupled with the host system 120, 122, 124 by the physical host interface (e.g., PCIe bus). The physical host interface can provide an interface for passing control, address, data, and other signals between the memory sub-system 110 and the host system 120, 122, 124. FIG. 1 illustrates a memory sub-system 110 as an example. In general, each of the host systems 120, 122, and 124 can access multiple memory sub-systems via a same communication connection, multiple separate communication connections, and/or a combination of communication connections.

In some embodiments, the host system 120, 122, 124 can be coupled to memory sub-system 110 via a compute express link (CXL) interface. In such embodiments, memory sub-system 110 can be a CXL system configured to support CXL protocols. A CXL interface refers to an interface that can support a number of protocols that can run on top of PCIe, including a CXL.io protocol, a CXL.mem protocol, and a CXL.cache protocol. A CXL.io protocol is similar to a PCIe protocol in that can be viewed as an "enhanced" PCIe protocol capable of carving out managed memory. The CXL interface can be used for initialization, link-up, device discovery and enumeration, as well as for register access. The CXL interface can also provide an interface for I/O devices. The CXL.mem protocol can enable host access to the memory of an attached device using memory semantics (e.g., load and store commands). This approach can support both volatile and persistent memory architectures, in accordance with embodiments described herein. The CXL.cache protocol can define host-device interactions to enable efficient caching of host memory with low latency using a request and response approach. Traffic can run through the CXL.io protocol, and the CXL.mem and CXL.cache protocols can share a common link layer and transaction layer. Accordingly, the CXL protocols can be multiplexed and transported via a PCIe physical layer.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM). Some of the foregoing types of non-volatile memory that can be included in memory device 130, such as the 3D cross-point memory, MRAM, PCM, SSTRAM and others can be referred to herein as storage-class memory (SCM) or persistent memory (PMEM).

In some embodiments, one or more of the memory devices 130, 140 of memory sub-system 110 can be a PMEM device. A persistent memory, in accordance with embodiments provided herein, refers to a memory device or a portion of a memory device (i.e., a persistent memory region) that stores data items such that the data can be accessed even after the end of the process that created or last modified the data items. In some embodiments, the memory device 130, 140 can be a PMEM device that is a non-volatile memory device. In other or similar embodiments, the memory device 130, 140 can be a PMEM device that is a power protected volatile memory device (e.g., a power protected dynamic random-access memory (DRAM) device). In some embodiments, memory sub-system 110 may not include a memory device 130, 140 that is a PMEM device in its entirety and, instead, memory device 130 and/or memory device 140 can include one or more persistent memory regions. A persistent memory region refers to a portion of a memory device that supports persistent memory storage, in accordance with embodiments described herein. For example, in some embodiments, memory device 130 can be a volatile memory device instead of a non-volatile memory device and at least a portion of memory device 140 can be power protected volatile memory.

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and one or more host systems 120, 122, 124.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120, 122, 124 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120, 122, 124.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a snapshot management component (SMC) 113 that can receive data and store data on the memory device 130, manage snapshots of the data, and manage accesses to the data by one or more host systems 120, 122, 124. In some embodiments, the memory sub-system controller 115 includes at least a portion of the snapshot management component 113. In some embodiments, the snapshot management component 113 is part of the host system 110, an application, or an operating system. In other embodiments, local media controller 135 includes at least a portion of snapshot management component 113 and is configured to perform the functionality described herein.

In some embodiments, the snapshot management component 113 can receive from host system 120, a data object created by a host application 121a. The SMC 113 can store the data object on the memory device 130, which can be a fabric-attached memory device, a byte-addressable memory device, as well as a fabric-attached byte-addressable memory device. In some embodiments, the SMC can map the physical memory addresses where the data object resides on the memory device 130 (e.g., physical address range or extent list of non-contiguous physical address ranges indicating the locations on the memory device 130 of the data object's data) to corresponding virtual memory addresses of a host application in the virtual address space of a host system 120, 122, 124. Additionally, the SMC 113 can create and remove snapshots of data objects and manage the modification of data objects by host applications on the memory device 130. In several embodiments, the SMC 113 can receive, from host applications, requests to access (e.g., read or write) the data of the data object, and can respond to such requests by performing a sequence of operations that can depend on whether the requesting host application is a producer or a consumer. In some embodiments, in response to receiving a request from a host application to write data to the data object, the SMC 113 can determine to accept or not to accept the request based on whether the requesting host application is a producer or a consumer.

Accordingly, in some embodiments, the SMC 113 can receive, from a producer (e.g., a host application), a data object to store on the memory device 130. The SMC 113 can store the data object on the memory device 130 and map the one or more physical address ranges identifying respective locations containing storing the data object (also referred to herein as "physical address ranges of the data object" containing data of the data object) on the memory device 130 with corresponding virtual address ranges in the virtual address space available to the producer (i.e., the logical address space allocated by a host system to the host application that created the data object). In some embodiments, the SMC 113 can assign an object identifier to the data object by associating (e.g., in a metadata entry in a data structure) the object identifier with the physical address ranges of the data object on the memory device 130. In this manner, the SMC 113 can register the data object on the memory device, where, for the purposes of this disclosure, the "registering" refers to indicating that the data object is subject to snapshotting.

Snapshotting, in this context, refers to associating the state of the data object at a particular time with a snapshot identifier. Thus, in some embodiments, the SMC 113 can associate (e.g., in a metadata entry in a data structure) the object identifier with a snapshot identifier to define a snapshot of the data of the data object on the memory device 130. In this manner, a particular snapshot of the data object is reflective of the state of the data of the data object at the time that the snapshot was created (i.e., the time that the identifier of that particular snapshot was assigned to the data object). The snapshot can, therefore, be associated with the state of the data as well as with the locations (i.e., physical address ranges) of the data of the data object on the memory device at the time that the snapshot was created. The physical address ranges identifying respective locations on the memory device 130 storing the data object can be referred to as "the physical address ranges of the snapshot" containing data of the data object for the purposes of this disclosure. Note that while initially the physical address ranges of the snapshot can be identical to the physical address ranges of the data object, the physical address ranges of the data object can subsequently change if the data object is modified. Consequently, the SMC 113 can map the snapshot to a consumer (e.g., another host application) by mapping the physical address ranges of the snapshot to corresponding virtual address ranges in a virtual address space of a consumer (i.e., the logical address space allocated by a host system to a host application that is permitted to read but not to modify the data object).

In the various embodiments of the present disclosure, the SMC 113 can implement one or more different mechanisms for handling modifications to a data object as well as for handling and responding to request to access (i.e., read/write) the data of the data object. These mechanisms are described in more detail with reference to FIGS. 2A-2C and continued reference to FIG. 1.

Figure 2A:
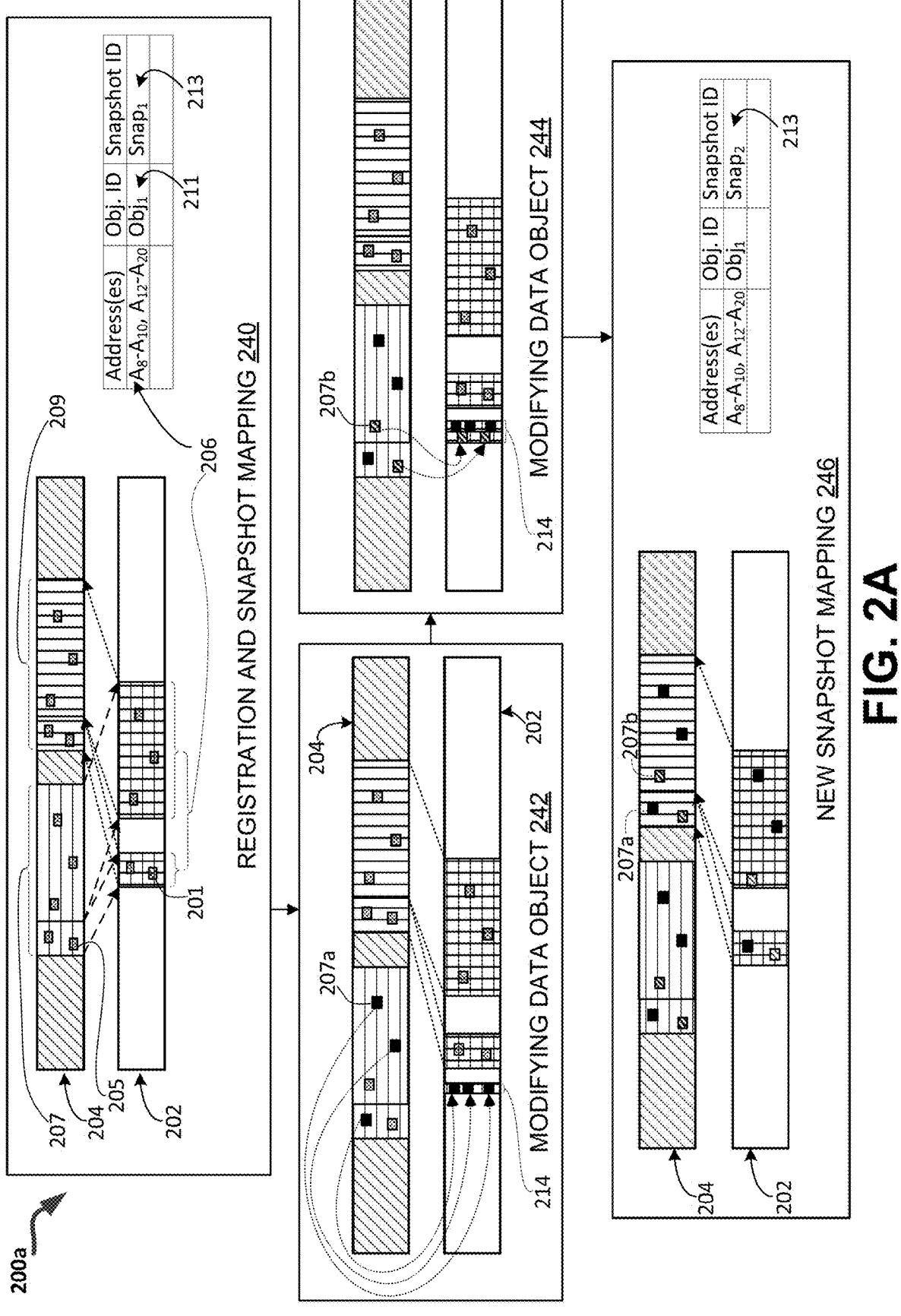
FIG. 2A depicts a sequence of block diagrams illustrating example states of physical address space and virtual address space in accordance with some embodiments of the present disclosure.
Figure 2B:
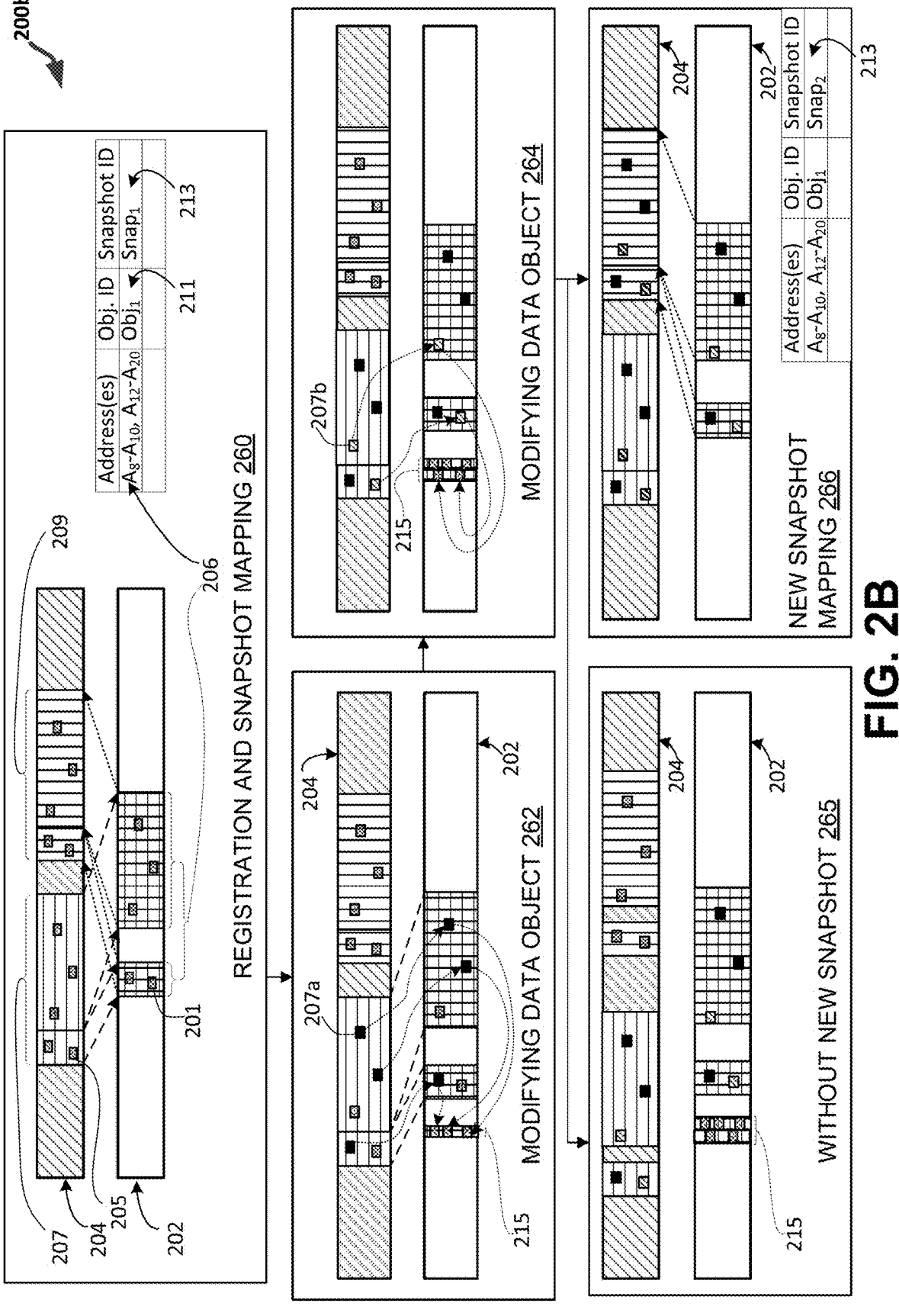
FIG. 2B depicts a sequence of block diagrams illustrating example states of physical address space and virtual address space in accordance with some embodiments of the present disclosure.
Figure 2C:
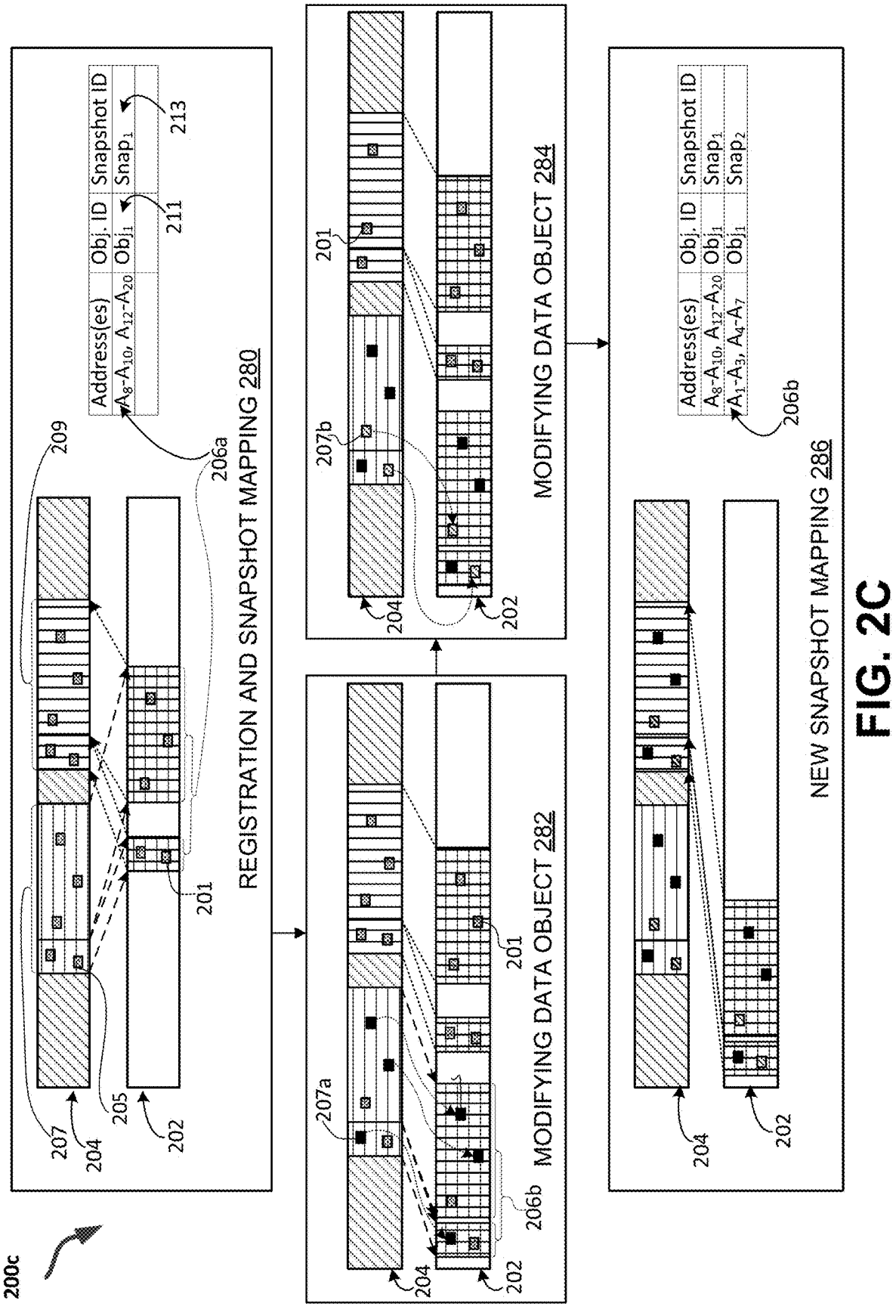
FIG. 2C depicts a sequence of block diagrams illustrating example states of physical address space and virtual address space in accordance with some embodiments of the present disclosure.

Each of the FIGS. 2A-2C depicts a sequence of block diagrams illustrating example states of physical address space and virtual address space in accordance with some embodiments of the present disclosure. Furthermore, although in some embodiments, the producer and consumer can each be executed on different respective host systems, all of the FIGS. 2A-2C are illustrative of relationships between a producer, a consumer, and the data object according to embodiments where the consumer and producer are each respectively different host applications 121a, 121n being executed on the same host system 120. Nevertheless, each of the FIGS. 2A-2C are representative of different embodiments, each embodiment implementing a different mechanism for recording changes to the data object. FIGS. 2A-2B illustrate relationships for embodiments that use a change log to record changes made to a data object by a producer, while FIG. 2C illustrates relationships for an embodiment that uses a duplicate copy of the data object to record changes made to the data object by a producer.

The operation of SMC 113 and the relationships shown in the first block 240, 260, 280 of the respective sequences of FIGS. 2A-2C can be similar or analogous to each other. For example, in these embodiments, the SMC 113 can store a data object made up of multiple parts 201 on the memory device 130 and map the physical address ranges 206 of the data object within the physical address space 202 on the memory device 130 with corresponding virtual address ranges 207 in the virtual address space 204 available to the producer. In these embodiments, the memory device 130 is a FAM memory device and, as illustrated by the gap in the depicted physical address space 202 on the memory device 130, the physical address ranges 206 are not contiguous.

In some embodiments, the SMC 113 can assign an object identifier 211 to the data object by associating the object identifier with the physical address ranges 206. In response to receiving, from the producer, a request to write to the data object, the SMC 113 can record modifications made to a part of the data object on the memory device 130 or on another memory device. As the producer modifies parts 205 of the data object in the producer's cache, the SMC 113 can update or replace parts 201 of the data object on the memory device 130 with the modified parts in the same location (i.e., same physical address range where the part resided previously). Alternatively, as the producer modifies parts 205 of the data object in the producer's cache, the SMC 113 can record the modifications and store the modified parts in a different location while tracking the mapping of the previous location of the part to the different location (e.g., on the memory device 130 or memory sub-system 110) so that the producer's mapping of the data object part (i.e., mapping of the physical addresses corresponding to the data object part's virtual address in the consumer's virtual address space) is continually updated to correspond to the location of the modified part on the memory device.

In some embodiments, the SMC 113 can associate the object identifier 211 with a snapshot identifier 213 to define a snapshot of the data of the data object on the memory device 130. Consequently, the SMC 113 can map the snapshot to a consumer (e.g., another host application) by mapping the physical address ranges 206 of the snapshot to corresponding virtual address ranges 209 in a virtual address space 204 of a consumer. Accordingly, at this time, parts 201 of the data object located in the physical address space 202 of the memory device 130 are consistent with (i.e., in the same state as) corresponding parts 205 of the data object most recently present in the consumer's cache.

FIG. 2A depicts a sequence 200a of block diagrams illustrating example states of physical address space and virtual address space in accordance with embodiments that use a current-state log to record changes made to a data object. In these embodiments, after a snapshot of the data object is created, a producer (e.g., a producer host application) can make changes (e.g., in its cache) to parts 201 of the data object and, thus, generate modified parts 207a of the data object. Consequently, as shown in block 242, the SMC 113 can record, in a change log associated with the snapshot, entries that are respectively reflective of changes made to the data object by the producer. In some embodiments, the change log can be associated (e.g., in a metadata entry in a data structure) with the snapshot identifier 213 to indicate that the records contained in the change log pertain to modifications relative to the state of the data object corresponding to the snapshot identifier 213. For example, the SMC 113, can record entries in a current-state log 214 that contain the modified parts 207a of the data object. In some embodiments, instead of containing an entire modified part, each of the entries can contain information that represents the difference between the modified part 207a and the previous state of the part 201, 205 of the data object. For a specified data object part that has been modified, this type of information can also be referred to as the "delta information" for that part. Accordingly, in some embodiments, the modified parts 207a or their respective delta information recorded in the entries of the current-state log 214 can be stored in a location on the memory device that is different than the location where the part was stored previously.

In these embodiments, the previous state of the part 201 of the data object (i.e., the previous state of the data object part prior to modification) can, therefore, remain in the physical location(s) (e.g., physical addresses in ranges 206) previously associated with the snapshot of the data object mapped to a consumer's virtual address range(s) 209 in space 204. Accordingly, the change log (i.e., current-state log 214) can contain an entry with a record (e.g., delta information or the entire modified part) representative of the current state of the part 207a of the data object along with a record of the physical location (i.e., physical address) of the corresponding previous state of the part 201 that is consistent with the consumer mapping (i.e., consistent with the state of the data object at the time the snapshot was mapped to the virtual address space of the consumer or at the time a part of the data object was placed in in the consumer's cache). This dissociation of the information reflective of the current state of a modified data object part and the previous state of the data object part allows the SMC 113 to treat access requests differently based on whether the requesting host application is a producer or a consumer. For example, it enables the SMC 113 to respond to consumer requests to read a part of the data object by fetching the data consistent with consumer mapping directly from its physical memory address, while ensuring that the SMC 113 can find and provide data object parts to producers in a consistent state in response to producer requests to read a part of the data object that was modified. Similarly, it enables the SMC 113 to respond to consumer requests to write a part of the data object by rejecting (or simply ignoring) the request, while ensuring that the SMC 113 can record changes made by producers to a data object part, in response to producer requests to write (e.g., modify) the part of the data object.

In these embodiments, if the SMC 113 subsequently receives a read request (i.e., a request to access a part of the memory object) from a producer, the SMC 113 can perform the following sequence of operations to locate and transmit the requested part to the producer. The SMC 113 can first reference the change log, to determine if the requested part of the data object has been modified by the producer, before attempting to retrieve the requested part from its previous physical location on the memory device. For example, if the requested part was modified, the SMC 113 can find the corresponding entry (i.e., the entry with the current state of the requested part and with the corresponding location where the part resides in its previous state) in the current-state log 214. In this case, the SMC 113 can determine that the requested part has been modified and can obtain the requested part of the data object in its current state from the current-state log 214. The SMC 113 can then provide to the consumer the requested part of the data object from the change log without or by combining information from the change log with the data object part in its previous state in its physical location on the memory device 130. On the other hand, if upon referencing the change log, the SMC 113 fails to find an entry corresponding to the requested part of the data, then an inference can be made that the requested part of the data is unmodified and still present in its previous state in its corresponding physical location on the memory device 130. Consequently, the SMC 113 can determine that the requested part has not been modified and can then retrieve the requested part of the data object from its physical location on the memory device 130 and provide it to the producer.

Furthermore, if additional modifications are made to parts of the data object, as shown in block 244, the SMC 113 can continue to record additional entries respectively reflective of the additional changes made to the data object by the producer. For example, the SMC 113, can record entries in the current-state log 214 that contain additional modified parts 207b of the data object. In some embodiments, each of the entries can contain information reflective of the difference between the modified part 207b and the previous state of the part 201, 205 of the data object. Similarly, in some embodiments, the modified parts 207b or their respective delta information recorded in the entries of the current-state log 214 can be stored in a location on the memory device that is different than the location where the part was stored previously.

Accordingly, in embodiments using a current-state log, the SMC 113 can respond to read requests differently depending on whether the read request is received from a consumer or from a producer. In other words, if a change was made, the SMC 113 can find a corresponding entry in the current-state log 214, and if a change was not made, the memory sub-system can fail to find a corresponding entry in the current-state log 214. Having found the corresponding entry in the current-state log 214 after the SMC 113 received the read request from a producer, the SMC 113 can provide the current state of the requested part 207b of the data object from the log 214 to the producer. For example, in some embodiments the SMC 113 can retrieve the requested part 207b in its current state from the current-state log 214. In other embodiments, the SMC 113 can combine the delta information of the requested part from the current-state log 214 with the previous state of the part still remaining stored in its previous location on the memory device to generate the current state of the requested part and provide it to the producer. On the other hand, having failed to find the corresponding entry in the current-state log 214 after the SMC 113 received the read request from a producer, the SMC 113 can retrieve the requested part 201 from its corresponding physical location (i.e., from the physical address range(s) of the data object or the physical address range(s) of the last snapshot) on the memory device and transmit it to the producer (since the state of the requested data object has not been changed). Furthermore, in these embodiments, if the SMC 113 receives the read request from a consumer, regardless of whether a change was made, the SMC 113 can retrieve the requested part 201 from its corresponding physical location (i.e., from the physical address range(s) of the snapshot) on the memory device 130 and transmit it to the consumer in response to the request.

In some of these embodiments, upon receiving from a host application a write request associated with the data object, the SMC 113 can determine whether or not to accept the request. For example, if the requesting host application is a consumer, the SMC 113 can determine to not accept the request (e.g., ignore the request or respond with a rejection of the request). In such cases, the SMC 113 can send, to the consumer, a notification with an indication that the consumer that the write request will not be satisfied. Conversely, if the requesting host application is a producer, the SMC 113 can determine to accept the request and write the data of the request in memory device 130 by recording the changes/modification to parts of the data object as described above. Accordingly, in some embodiments consumers are not permitted to perform write operations.

Additionally, in these embodiments, the SMC 113 can create a subsequent snapshot of the data object by modifying the data object using the changes reflected by entries recorded in a change log, and then associating the object identifier with a different snapshot identifier 213 to define the subsequent snapshot of the object on the memory device 130, as shown in block 246. In this manner, the subsequent snapshot of the data object can be reflective of the state of the data of the data object at the time that the subsequent snapshot was created (i.e., the time that the identifier of the subsequent snapshot was assigned to the data object). The subsequent snapshot can, therefore, be associated with the current state of the data as well as with the locations (i.e., physical address ranges) of the data of the data object on the memory device at the time that the snapshot was created. For example, in embodiments where the current-state log 214 contains a modified part of the data object, the SMC 113 can replace the corresponding part of the data object located in the location consistent with the previous snapshot mapping with the modified part from the current state log 214. Similarly, in embodiments where the current-state log 214 contains delta information for a part of the data object, the SMC 113 can edit the corresponding part of the data object, located in the location consistent the previous snapshot mapping, with the modifications represented by the delta information from the current-state log 214.

In some cases, the modification of a part of a data object can cause it to become larger and require more space for the SMC 113 to store it on the memory device than the part required in a previous state. In other cases, the SMC 113 can store modified parts of the data object in a different location on the memory device than the location where the part was stored in its previous state. Accordingly, in these embodiments, creating a subsequent snapshot of the data object can include the SMC 113 modifying the one or more physical address ranges associated with the object identifier to generate one more modified physical address ranges (e.g., in a metadata entry in a data structure) so that the subsequent snapshot can be mapped to one or more consumers. These modified physical address ranges identifying respective locations containing data of the subsequent snapshot of the data object can be referred to as "the physical address ranges of the subsequent snapshot". Accordingly, the SMC 113 can map the physical address ranges of the subsequent snapshot to corresponding virtual address ranges of the consumer and can replace a data part in a previous state in the processor cache of the consumer with the modified data part 207*a*, 207*b* (i.e., the data part in its current state). In other embodiments, the modification of the data objects and the treatment of read requests from consumers and producers can be reversed as explained in more detail with reference to FIG. 2B.

FIG. 2B depicts a sequence 200*b* of block diagrams illustrating example states of physical address space and virtual address space in accordance with embodiments that use a previous-state log to record changes made to a data object. In these embodiments, after a snapshot of the data object is created, a producer (e.g., a producer host application) can make changes (e.g., in its cache) to parts 201 of the data object and, thus, generate modified parts 207*a* of the data object. Consequently, as shown in block 262, the SMC 113 can record, in a change log associated with the snapshot, entries that are respectively reflective of the previous states of the parts 201 of the data object (i.e., the previous state of the data object part prior to modification) obtained from the physical location(s) (e.g., physical addresses in ranges 206) previously associated with the snapshot of the data object mapped to a consumer's virtual address range(s) 209 in space 204. The presence, in the change log, of information relating to a previous state of a part of the data object can be reflective or indicative of a modification having been made to the part by the producer. In some embodiments, the change log can be associated (e.g., in a metadata entry in a data structure) with the snapshot identifier 213 to indicate that the records contained in the change log pertain to the previous state of the data object corresponding to the snapshot identifier 213. For example, the SMC 113, can record entries in a previous-state log 215 that contain the parts 201, 205 of the data object in their previous state (i.e., the state prior to the latest modification of those parts by the producer). In some embodiments, instead of containing an entire part of the data object, each of the entries can contain information that represents the difference between the previous state of the part 201, 205 of the data object and the modified part 207*a* data object. For a specified data object part that has been modified, this type of information can also be referred to as the "delta information" for that part. Accordingly, in some embodiments, the parts 201, 205 in their previous state or their respective delta information recorded in the entries of the previous-state log 215 can be stored in a location on the memory device that is different than the location where the part was stored previously.

In these embodiments, the modified parts 207*a* (i.e., the current state of the parts 201, 205) of the data object representative of changes made to the data object by the producer can, therefore, be stored by SMC 113 in the physical location(s) (e.g., physical addresses in ranges 206) previously associated with the snapshot of the data object mapped to a consumer's virtual address range(s) 209 in space 204. Accordingly, the change log (i.e., previous-state log 215) can contain an entry with a record (e.g., delta information or the entire part 201, 205 in its previous state) representative of the previous state of the part 201, 205 of the data object along with a record of the previous physical location (i.e., physical address) of the part 201 that was consistent with the consumer mapping (i.e., consistent with the state of the data object at the time the snapshot was mapped to the virtual address space of the consumer or at the time a part of the data object was placed in in the consumer's cache). As in other embodiments, this dissociation of the information reflective of the current state of a modified data object part and the previous state of the data object part allows the SMC 113 to treat access requests differently based on whether the requesting host application is a producer or a consumer. For example, it enables the SMC 113 to respond to producer requests to read a part of the data object by fetching the data consistent with producer mapping directly from its physical memory address, while ensuring that the SMC 113 can find and provide data object parts to consumers in a consistent state in response to consumer requests to read a part of the data object that was modified by the producer after the last snapshot was mapped to the consumer. Similarly, it enables the SMC 113 to respond to consumer requests to write a part of the data object by rejecting (or simply ignoring) the request, while ensuring that the SMC 113 can record changes made by producers to a data object part, in response to producer requests to write (e.g., modify) the part of the data object.

In these embodiments, if the SMC 113 subsequently receives a read request (i.e., a request to access a part of the memory object) from a consumer, the SMC 113 can perform the following sequence of operations to locate and transmit the requested part to the consumer. The SMC 113 can first reference the change log, to determine if the requested part of the data object has been modified by the producer, before attempting to retrieve the requested part from its previous physical location on the memory device. For example, if the requested part was modified, the SMC 113 can find the corresponding entry (i.e., the entry with the requested part in its previous state and with the corresponding location where the part previous resides in its previous state and currently resides in its current state on the memory device 130) in the previous-state log 215. In this case, by finding the entry, the SMC 113 can determine that the requested part has been modified and can obtain the requested part of the data object in its previous state from the previous-state log 215. The SMC 113 can then provide to the consumer the requested part of the data object from the change log without retrieving it from its previous physical location on the memory device 130 (i.e., the physical location where the part now resides in its current state). On the other hand, if upon referencing the change log, the SMC 113 fails to find an entry corresponding to the requested part of the data, then an inference can be made that the requested part of the data is unmodified and still present in its previous state in its corresponding physical location on the memory device 130. Consequently, the SMC 113 can determine that the requested part has not been modified and can then retrieve the requested part of the data object from its physical location on the memory device 130 and provide it to the consumer.

Furthermore, if additional modifications are made to parts of the data object, as shown in block 264, the SMC 113 can continue to record additional entries respectively reflective of the states of data object parts prior to the additional changes being made to the data object by the producer. For example, the SMC 113, can record entries in the previous-state log 215 that contain the previous state of the parts 201, 205 of the data object, or entries that contain delta information for the part 201, 205 data object. Similarly, in some embodiments, the parts 201, 205 in their previous state or their respective delta information recorded in the entries of the previous-state log 215 can be stored in a location on the memory device that is different than the location where the part was stored previously.

Accordingly, in embodiments using a previous-state log, the SMC 113 can respond to read requests differently depending on whether the read request is received from a consumer or from a producer. In other words, if a change was made, the SMC 113 can find a corresponding entry in the previous-state log 215, and if a change was not made, the memory sub-system can fail to find a corresponding entry in the previous-state log 215. Having found the corresponding entry in the previous-state log 215 after the SMC 113 received the read request from a consumer, the SMC 113 can provide the previous state of the requested part 201, 205 of the data object from the log 215 to the consumer. For example, in some embodiments the SMC 113 can retrieve the requested part 201, 205 in its previous state from the previous-state log 215. In other embodiments, the SMC 113 can combine the delta information of the requested part from the previous-state log with the current state of the part stored in its location on the memory device to generate the previous state of the requested part and provide it to the consumer. On the other hand, having failed to find the corresponding entry in the previous-state log 215 after the SMC 113 received the read request from a consumer, the SMC 113 can retrieve the requested part 201, 205 from its corresponding physical location (i.e., from the physical address range(s) of the data object or the physical address range(s) of the last snapshot) on the memory device and transmit it to the consumer (since the state of the requested data object has not been changed). Furthermore, in these embodiments, if the SMC 113 receives the read request from a producer, regardless of whether a change was made, the SMC 113 can retrieve the requested part 201, 205 from its corresponding physical location (i.e., from the physical address range(s) of the data object) on the memory device 130 and transmit it to the producer in response to the request.

In some of these embodiments, upon receiving from a host application a write request associated with the data object, the SMC 113 can determine whether to accept the request or not. For example, if the request is received from a consumer host application, the SMC 113 can determine to not accept the request (e.g., ignore the request or respond with a rejection of the request). In such cases, the SMC 113 can respond by sending, to the consumer host application, a notification indicating that the consumer's write request is not allowed. Conversely, if the request is received from a producer host application, the SMC 113 can determine to accept the request and write the data of the request in memory device 130 to the memory device 130 by recording the changes/modification to parts of the data object as described above. Accordingly, in some embodiments consumers are not permitted to perform write operations.

Additionally, in these embodiments, the SMC 113 can create a subsequent snapshot of the data object by modifying the data object and then associating the object identifier with a different snapshot identifier 213 to define the subsequent snapshot of the object on the memory device 130, as shown in block 266. In this manner, the subsequent snapshot of the data object can be reflective of the state of the data of the data object at the time that the subsequent snapshot was created (i.e., the time that the identifier of the subsequent snapshot was assigned to the data object). The subsequent snapshot can, therefore, be associated with the current state of the data as well as with the locations (i.e., physical address ranges) of the data of the data object on the memory device at the time that the snapshot was created.

In some cases, the modification of a part of a data object can cause it to become larger and require more space for the SMC 113 to store it on the memory device than the part required in a previous state. In other cases, the SMC 113 can store modified parts of the data object in a different location on the memory device than the location where the part was stored in its previous state. Accordingly, in these embodiments, creating a subsequent snapshot of the data object can also include the SMC 113 modifying the one or more physical address ranges associated with the object identifier to generate one more modified physical address ranges (e.g., in a metadata entry in a data structure) so that the subsequent snapshot can be mapped to one or more consumers. Accordingly, the SMC 113 can map the physical address ranges of the subsequent snapshot to corresponding virtual address ranges of the consumer and can replace a data part in a previous state in the processor cache of the consumer with the modified data part 207a, 207b (i.e., the data part in its current state). In other embodiments, the modification of the data objects and the treatment of read requests from consumers and producers can be mirrored relative to two copies of the data object stored on the memory device 130 as explained in more detail with reference to FIG. 2C.

FIG. 2C depicts a sequence 200c of block diagrams illustrating example states of physical address space and virtual address space in accordance with embodiments that use a duplicate copy of the data object to record changes made to a data object. In these embodiments, after a snapshot of the data object is created, a producer (e.g., a producer host application) can also make changes (e.g., in its cache) to parts 201 of the data object and, thus, generate modified parts 207a of the data object. As shown in block 282, the SMC 113 can create a duplicate copy of the original data object on the memory device 130 and map the physical address ranges 206b of the duplicate copy of the data object with corresponding virtual address ranges in the virtual address space available to the producer that were previously mapped to the physical address ranges of the snapshot of the data object. Consequently, as shown in blocks 282 and 284, the SMC 113 can replace parts 201, 205 of the data object in their previous states in the copy of the data object with modified parts 207a and 207b of the data objects (i.e., data object parts in their current states)

In these embodiments, the modified parts 207a (i.e., the current state of the parts 201, 205) of the data object representative of changes made to the data object by the producer can, therefore, be stored by SMC 113 in the physical location(s) (e.g., physical addresses in ranges 206b) of the duplicate copy of the data object. In contrast, the parts 201, 205 of the data object in their previous state can remain stored in the physical address ranges of the snapshot of the data object mapped to a consumer's virtual address range(s) 209 in space 204. As in other embodiments, this dissociation of the information reflective of the current state of a modified data object part and the previous state of the data object part allows the SMC 113 to treat read requests differently based on whether the requesting host application is a producer or a consumer. For example, it enables the SMC 113 to respond to producer requests to read a part of the data object by fetching the data consistent with producer mapping directly from the physical address range(s) 206b of the copy of the data object, and also enables SMC 113 to respond to consumer requests to read a part of the data object by fetching the data consistent with consumer mapping directly from the physical address range(s) 206a of the snapshot of the data object. Similarly, it enables the SMC 113 to respond to consumer requests to write a part of the data object by rejecting (or ignoring) the request, while ensuring that the SMC 113 can record changes made by producers to a data object part, in response to producer requests to write (e.g., modify) the part of the data object.

In these embodiments, if the SMC 113 receives the read request from a consumer or a producer, each request will be treated analogously relative to the physical address range mapped to the requester's virtual address space. For example, if the SMC 113 receives the read request from a consumer and regardless of whether a change was made, the SMC 113 can retrieve the requested part 201, 205 from its corresponding physical location (i.e., from the physical address range(s) of the snapshot) on the memory device 130 and transmit it to the consumer in response to the request. Similarly, if the SMC 113 receives the read request from a producer and regardless of whether a change was made, the SMC 113 can retrieve the requested part 201, 205 from its corresponding physical location (i.e., from the physical address range(s) of the copy of the data object) on the memory device 130 and transmit it to the consumer in response to the request.

In some of these embodiments, upon receiving from a host application a write request associated with the data object, the SMC 113 can determine whether to accept the request or not. For example, if the request is received from a consumer host application, the SMC 113 can determine to not accept the request (e.g., ignore the request or respond with a rejection of the request). In such cases, the SMC 113 can respond by transmitting, to the consumer host application, a notification indicating that the write request is not accepted or that it is not permitted. Conversely, if the request is received from a producer host application, the SMC 113 can determine to accept the request and write the data of the request in memory device 130 to the memory device 130 by recording the changes/modification to parts of the data object as described above. Accordingly, in some embodiments consumers are not permitted to perform write operations.

Additionally, in these embodiments, the SMC 113 can create a subsequent snapshot of the data object by associating the object identifier with the physical address range(s) of the copy of the data object and also associating it with a different snapshot identifier 213 to define the subsequent snapshot of the object on the memory device 130, as shown in block 286. In this manner, the subsequent snapshot of the data object can be reflective of the state of the data of the data object at the time that the subsequent snapshot was created (i.e., the time that the identifier of the subsequent snapshot was assigned to the data object). The subsequent snapshot can, therefore, be associated with the current state of the data as well as with the locations (i.e., physical address ranges) of the data of the copy of the data object on the memory device that was modified prior to the time that the snapshot was created. Accordingly, the SMC 113 can map the physical address ranges of the subsequent snapshot to corresponding virtual address ranges of the consumer and can replace a data part in a previous state in the processor cache of the consumer with the modified data part 207a, 207b (i.e., the data part in its current state).

FIG. 3 is flow diagram of an example method 300 for performing memory snapshot management on memory devices in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the snapshot management component (SMC) 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In some embodiments of the present disclosure, at operation 320, the processing logic can receive, from a host application (e.g., a producer) a data object to store on the memory device (e.g., memory device 130, 140 of FIG. 1). At operation 322, the processing logic can assign an object identifier to the data object. Assigning the object identifier can include the processing logic, at operation 324, associating (e.g., in a metadata item in a data structure) the object identifier with one or more physical address ranges identifying respective locations containing data of the data object on the memory device to register the data object on the memory device. As used herein, a metadata item can refer to a metadata entry or a data element (e.g., an entry in a table) containing metadata in a data structure.

In some embodiments, the processing logic can, at operation 326, associate (e.g., in a metadata item in a data structure) the object identifier with a snapshot identifier to define a snapshot of the data of the data object on the memory device. Subsequently, at operation 328, the processing logic can map the physical address ranges to corresponding virtual address ranges in a virtual address space of another host application (e.g., a consumer).

In some of these embodiments, the processing logic can receive requests to access (i.e., read/write) parts of the data object from the host application (e.g., consumers or producers) and respond differently in each case. For example, upon receiving from a host application a write request associated with the data object, the processing logic can, at operation 330, determine whether to accept the request or not based on whether the request was sent by a consumer host application or by a producer host application. For example, if the request is received from a consumer host application, the processing logic can, at operation 330, determine to not accept the request (e.g., ignore the request or respond with a rejection of the request). In such cases, the processing logic can respond to the request by transmitting, to the consumer host application, a notification indicating that the consumer host application's write request is not accepted. Conversely, if the request is received from a producer host application, the processing logic can, at operation 330, determine to accept the request. Therefore, in some embodiments, in response to receiving from the producer, a request to write to the data object, the processing logic can, at operation 330, record modifications made to a part of the data object on the memory device. Accordingly, at operation 330, the processing logic can record, in a change log associated with the snapshot, entries that are respectively associated with corresponding changes made to the data object by the first host application. The entries can include modified parts of the data object in some embodiments, while in other embodiments the entries can each include delta information for particular parts of the data object.

In some embodiments, the processing logic can receive read requests either from consumers or producers. Accordingly, at operation 332, the processing logic can determine whether the request to read a part of the data object received from the producer host application. In response to determining, at operation 332, that the request to read a part of the data object was received from a producer, the processing logic can, at operation 334, retrieve the requested part by referencing the change log prior to accessing the one or more physical address ranges. Alternatively, in response to determining, at operation 332, that the request to read a part of the data object was not received from a producer (and was instead received from a consumer), the processing logic can, at operation 336, retrieve the requested part from the one or more physical address ranges. In the several embodiments, the processing logic can handle read requests differently depending on the type of change log being used and on the source of the read requests. Additional details regarding the management and handling of read requests on memory devices are provided below with reference to FIG. 4.

Figure 4:
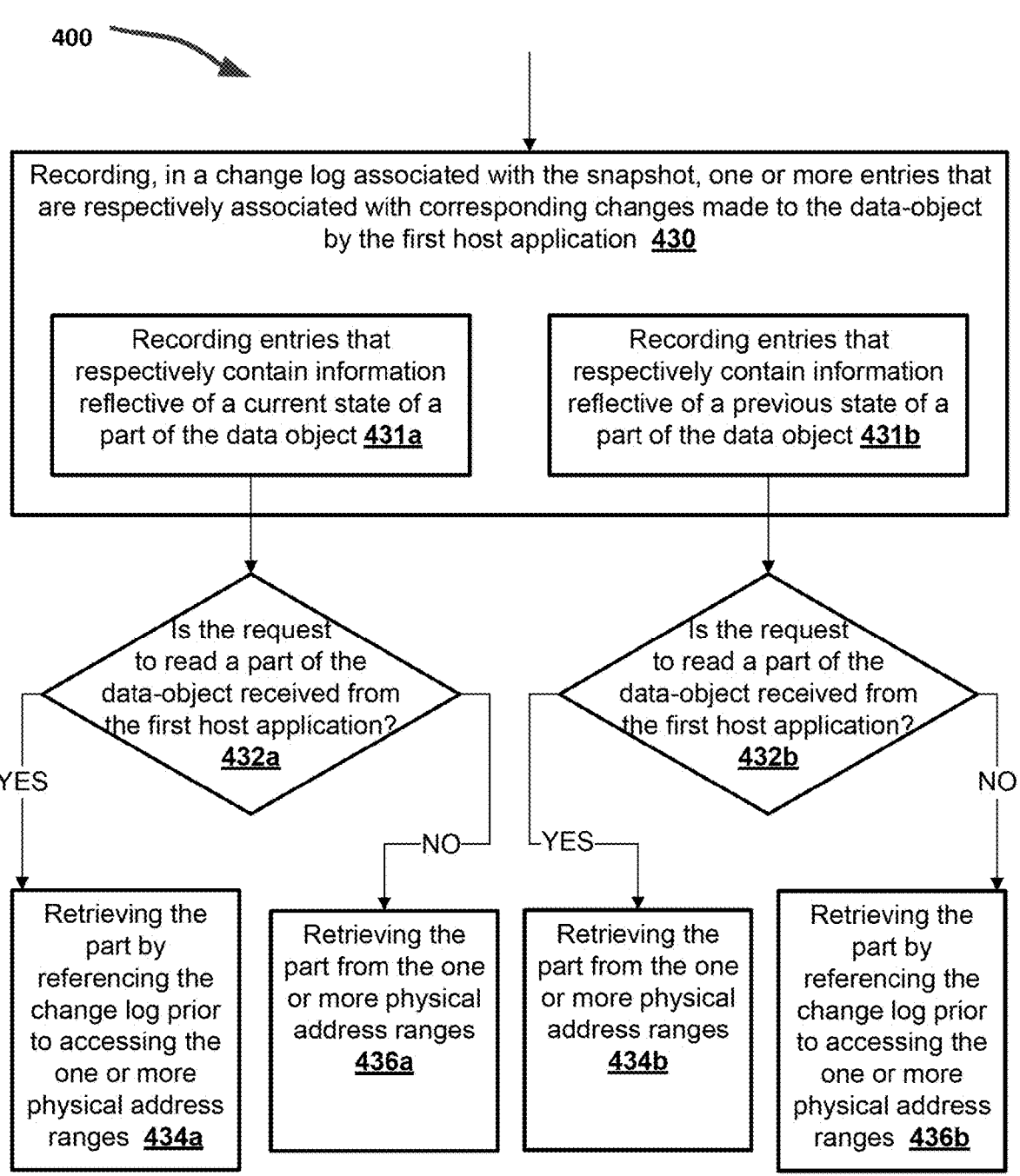
FIG. 4 is a flow diagram of an example method for managing read requests relating to modified data objects on memory devices in accordance with some embodiments of the present disclosure.

FIG. 4 is flow diagram of an example method 400 for managing read requests relating to modified data objects on memory devices in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the snapshot management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In several embodiments described herein, operations of example method 400 can be performed together with or instead of operations of example method 300. In some embodiments, at operation 420, the processing logic can record, in a change log associated with the snapshot, entries that are respectively associated with corresponding changes made to the data object by the first host application. In some embodiments the change log can be a current-state log. Accordingly, in these embodiments, the processing logic can, at operation 431a, record entries that respectively contain information reflective of a current state of a part of the data object. For example, the entries can respectively contain a part of a data object in its current state. In another example, the entries can respectively contain delta information for a part of a data object.

In these embodiments, at operation 432a, the processing logic can determine whether a request to read a part of the data object was received from a producer host application. In response to determining, at operation 432a, that the request to read a part of the data object was received from a producer host application, the processing logic can, at operation 434a, retrieve the requested part by referencing the change log prior to accessing the one or more physical address ranges. For example, in some embodiments the processing logic can retrieve the requested part in its current state from the current-state log. In other embodiments, the processing logic can combine the delta information of the requested part from the current-state log with the requested part in its previous state to generate the current state of the requested part and provide it to the producer. Alternatively, response to determining, at operation 432a, that the request to read a part of the data object was not received from a producer host application and was instead received from a consumer host application, the processing logic can, at operation 436a, retrieve the requested part from a location identified by an address in the physical address ranges (e.g., the address ranges of the snapshot).

In similar embodiments, the change log can be a previous-state log. Accordingly, in these embodiments, the processing logic can, at operation 431b, record entries that respectively contain information reflective of a previous state of a part of the data object. For example, the entries can respectively contain a part of a data object in its previous state. In another example, the entries can respectively contain delta information for a part of a data object.

In these embodiments, at operation 432b, the processing logic can determine whether a request to read a part of the data object was received from a producer host application. In response to determining, at operation 432b, that the request to read a part of the data object was received from a producer host application, the processing logic can, at operation 434b, retrieve the requested part from a location identified by an address in the physical address ranges (e.g., the address ranges of the snapshot). Alternatively, response to determining, at operation 432b, that the request to read a part of the data object was not received from a producer host application and was instead received from a consumer host application, the processing logic can, at operation 436b, retrieve the requested part by referencing the change log prior to accessing the one or more physical address ranges. For example, in some embodiments the processing logic can retrieve the requested part in its previous state from the previous-state log. In other embodiments, the processing logic can combine the delta information of the requested part from the previous-state log with the requested part in its current state to recover the previous state of the requested part and provide it to the producer. In some embodiments the processing logic can additionally modify parts of the data object and create subsequent snapshots of the data object on the memory device. Additional details regarding the modification of the data object as well as regarding the creation and mapping of subsequent snapshots are explained below with reference to FIG. 5.

Figure 5:
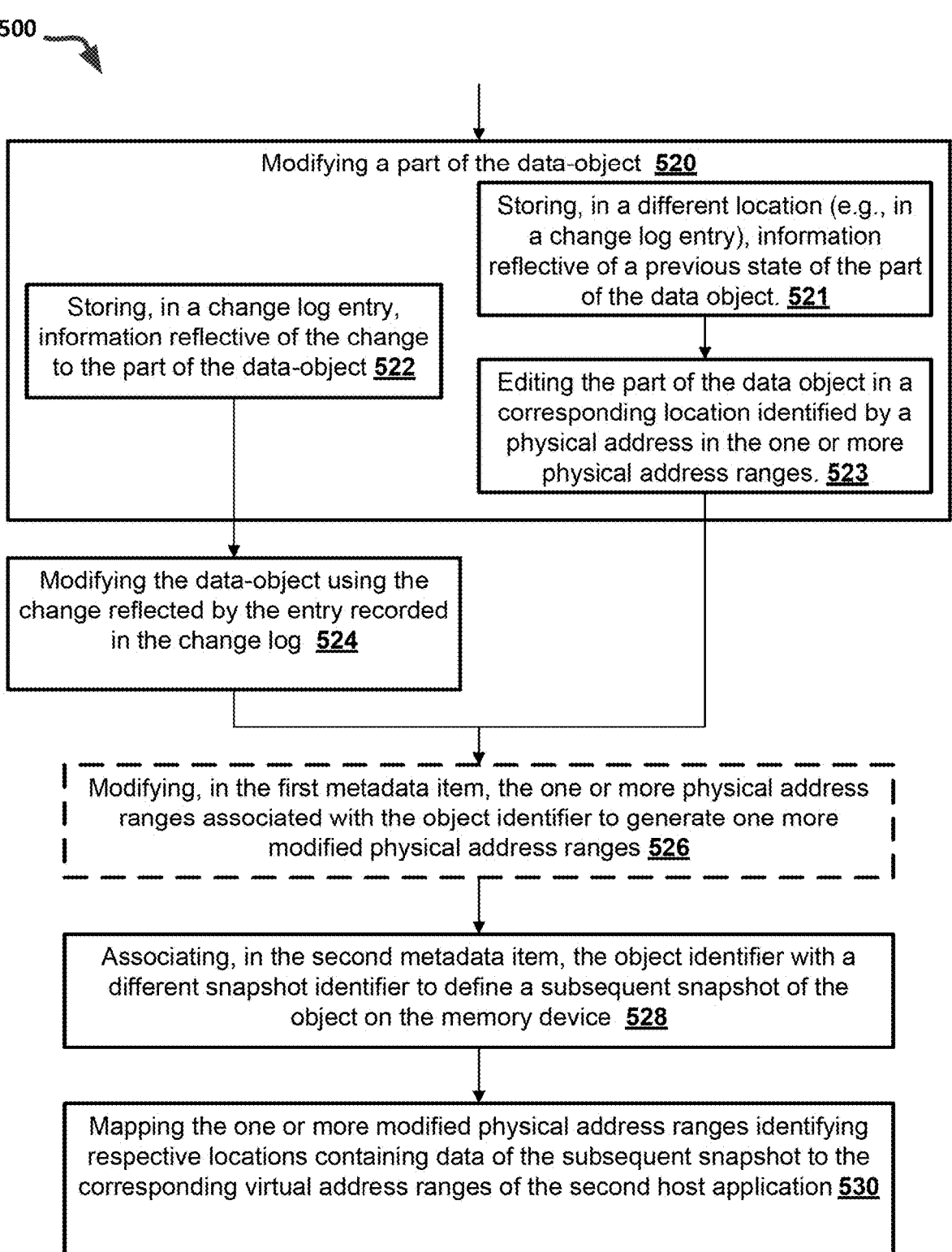
FIG. 5 is a flow diagram of an example method for creating a new snapshot on memory devices in accordance with some embodiments of the present disclosure.

FIG. 5 is flow diagram of an example method 500 for creating a new snapshot on memory devices in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the snapshot management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In several embodiments, at operation 520, the processing logic can modify, a part of the data object. In some embodiments, the processing logic can, at operation 522, store, in a change log entry, information reflective of the change to the part of the data object and then modify, at operation 524, the data object using the change reflected by the entry recorded in the change log. In other embodiments, the processing logic can, at operation 521 store, in a different location (e.g., in a change log entry), information reflective of a previous state of the part of the data object, and then, at operation 523, edit the part of the data object in a corresponding location identified by a physical address in the one or more physical address ranges (e.g., in the physical address ranges of the data object).

In cases where the modification of one or more data object parts results in parts of the data object being stored in a different set of physical address ranges on the memory device than the set of physical address ranges where the data object was stored prior to the modification of its parts, the processing logic can, at operation 526, modify (e.g., in a metadata item of a data structure) the one or more physical address ranges associated with the object identifier to generate one more modified physical address ranges (i.e., physical address ranges of the modified data object). In some embodiments, at operation 528, the processing logic can associate (e.g., in a metadata item of a data structure) the object identifier with a different snapshot identifier to define a subsequent snapshot of the object on the memory device. Consequently, at operation 530, the processing logic can map the one or more modified physical address ranges identifying respective locations storing the data of the subsequent snapshot to the corresponding virtual address ranges of the consumer host application.

Figure 6:
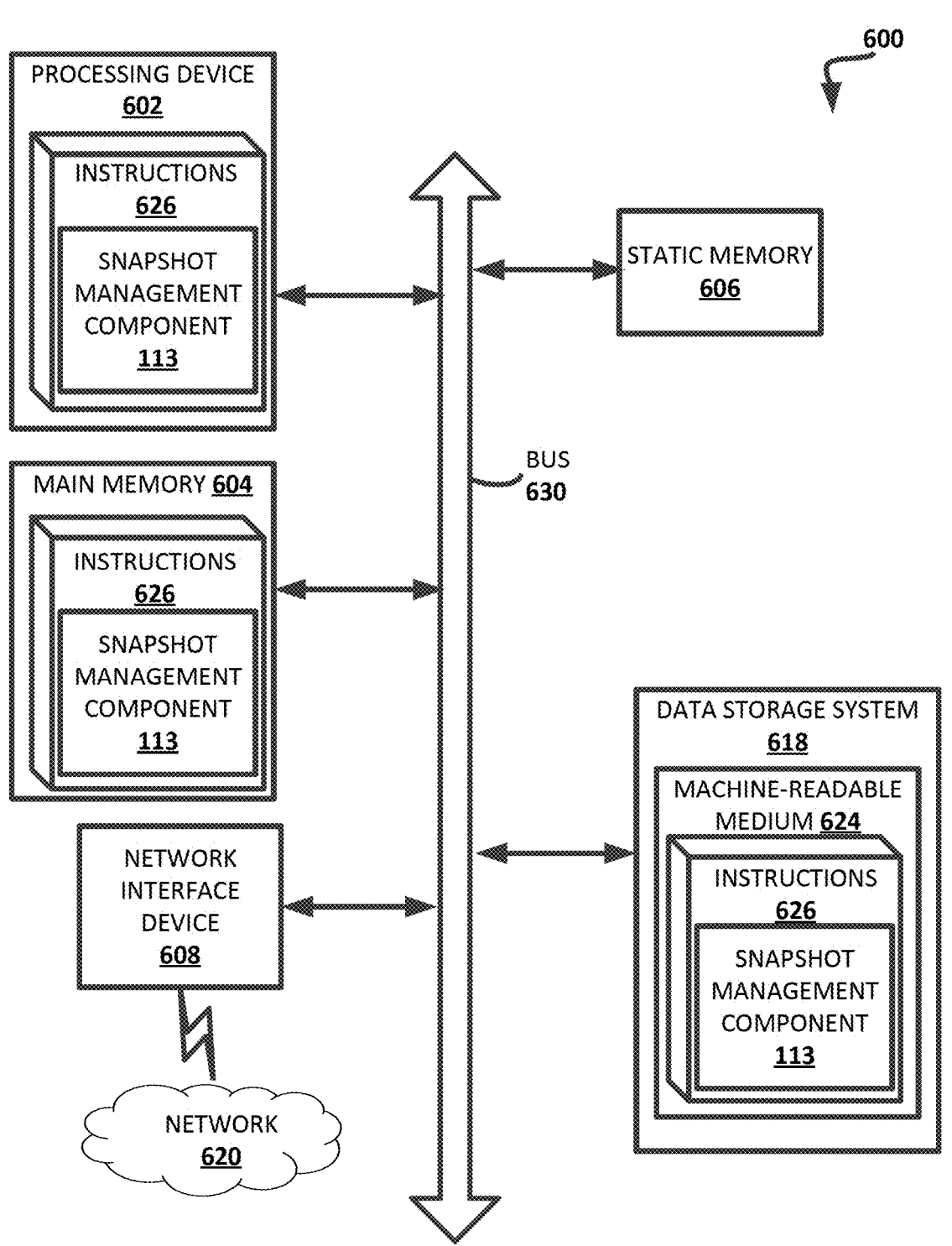
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the snapshot management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a SMC (e.g., the snapshot management component 113 of FIG. 1 and the methods 300, 400, and 500 of FIGS. 3, 4, and 5 respectively). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising byte-addressable memory; and
a processing device operatively coupled with the memory device, to perform operations comprising:
recording, in a change log associated with a snapshot of a data object, an entry reflecting a change made by a first host application to the data object, wherein the entry contains information reflecting a current state of a part of the data object;
receiving a request to read the part of the data object;
determining whether the request is received from the first host application;
responsive to determining that the request is received from the first host application, retrieving the part from the entry of the change log; and responsive to determining that the request is received from a second host application, retrieving the part from one or more physical address ranges identifying respective locations storing the data object on the memory device, wherein the one or more physical address ranges is associated with a previous state of the part of the data object.

2. The system of claim 1, wherein the operations further comprise:
associating, in a first metadata item, an object identifier with the one or more physical address ranges identifying respective locations storing the data object on the memory device.

3. The system of claim 2, wherein the operations further comprise:
mapping the one or more physical address ranges to corresponding virtual address ranges in a virtual address space of the second host application, wherein the one or more physical address ranges are not contiguous, and wherein the first host application is running on a first host system and the second host application is running on a second host system.

4. The system of claim 1, wherein the operations further comprise:
associating, in a second metadata item, an object identifier with a snapshot identifier to define the snapshot of the data object on the memory device.

5. The system of claim 4, wherein the operations further comprise:
applying, to the data object, the change reflected by the entry recorded in the change log; and
associating, by the second metadata item, the object identifier with a second snapshot identifier to define a subsequent snapshot of the data object on the memory device.

6. The system of claim 5, wherein the operations further comprise:
modifying, in a first metadata item, one or more physical address ranges associated with the object identifier to generate one more modified physical address ranges; and
mapping the modified physical address ranges identifying respective locations containing data of the subsequent snapshot of the data object to corresponding virtual address ranges of a second host application.

7. The system of claim 1, wherein the memory device is a fabric-attached memory device.

8. A system comprising:
a memory device comprising byte-addressable memory; and
a processing device operatively coupled with the memory device, to perform operations comprising:
recording, in a change log associated with a snapshot of a data object, an entry reflecting a change made by a first host application to the data object, wherein the entry contains information reflecting a previous state of a part of the data object;
receiving a request to read the part of the data object;
determining whether the request is received from the first host application;
responsive to determining that the request is received from a second host application, retrieving the part from the entry of the change log; and
responsive to determining that the request is received from the first host application, retrieving the part from one or more physical address ranges identifying respective locations storing the data object on the memory device, wherein the one or more physical address ranges is associated with a current state of the part of the data object.

9. The system of claim 8, wherein the operations further comprise:

associating, in a first metadata item, an object identifier with the one or more physical address ranges identifying respective locations storing the data object on the memory device.

10. The system of claim 9, wherein the operations further comprise:

mapping the one or more physical address ranges to corresponding virtual address ranges in a virtual address space of the first host application, wherein the one or more physical address ranges are not contiguous, and wherein the first host application is running on a first host system and the second host application is running on a second host system.

11. The system of claim 8, wherein the operations further comprise:

associating, in a second metadata item, an object identifier with a snapshot identifier to define the snapshot of the data object on the memory device.

12. The system of claim 11, wherein the operations further comprise:

applying, to the data object, the change reflected by the entry recorded in the change log; and associating, by the second metadata item, the object identifier with a second snapshot identifier to define a subsequent snapshot of the data object on the memory device.

13. The system of claim 12, wherein the operations further comprise:

modifying, in a first metadata item, one or more physical address ranges associated with the object identifier to generate one more modified physical address ranges; and mapping the modified physical address ranges identifying respective locations containing data of the subsequent snapshot of the data object to corresponding virtual address ranges of the first host application.

14. The system of claim 8, wherein the memory device is a fabric-attached memory device.

15. A method comprising:

recording, by a processing device, in a change log associated with a snapshot of a data object, an entry reflecting a change made by a first host application to the data object, wherein the entry contains information reflecting a current state of a part of the data object;

receiving a request to read the part of the data object;

determining whether the request is received from the first host application; and responsive to determining that the request is received from the first host application, retrieving the part from the entry of the change log; and responsive to determining that the request is received from a second host application, retrieving the part from one or more physical address ranges identifying respective locations storing the data object on a memory device, wherein the one or more physical address ranges is associated with a previous state of the part of the data object.

16. The method of claim 15, further comprising:

associating, in a first metadata item, an object identifier with the one or more physical address ranges identifying respective locations storing the data object on the memory device; and mapping the one or more physical address ranges to corresponding virtual address ranges in a virtual address space of the second host application, wherein the one or more physical address ranges are not contiguous, and wherein the first host application is running on a first host system and the second host application is running on a second host system.

17. The method of claim 15, further comprising:

associating, in a second metadata item, an object identifier with a snapshot identifier to define the snapshot of the data object on the memory device;

applying, to the data object, the change reflected by the entry recorded in the change log; and associating, by the second metadata item, the object identifier with a second snapshot identifier to define a subsequent snapshot of the data object on the memory device.

\* \* \* \* \*